United States Patent [19]

Hurst, Jr. et al.

[11] Patent Number: 4,562,487
[45] Date of Patent: Dec. 31, 1985

[54] VIDEO DISC ENCODING AND DECODING SYSTEM PROVIDING INTRA-INFIELD TRACK ERROR CORRECTION

[75] Inventors: Robert N. Hurst, Jr., Hopewell, N.J.; Michael A. Plotnick, Southampton, Pa.

[73] Assignee: RCA Corporation, Princeton, N.J.

[21] Appl. No.: 567,252

[22] Filed: Dec. 30, 1983

[51] Int. Cl.⁴ .......................................... G11B 21/10
[52] U.S. Cl. .................................. 358/342; 358/907; 369/43; 369/50; 369/59
[58] Field of Search ............... 360/8, 9.1, 10.1, 10.2, 360/32, 27; 369/50, 59, 43, 44, 46, 48, 111; 358/342, 336, 327, 907

[56] References Cited

U.S. PATENT DOCUMENTS 4,455,635  6/1984  Dieterich .............................. 369/59
4,488,278  12/1984  Dieterich ............................. 369/50

*Primary Examiner*—Donald McElheny, Jr.
*Attorney, Agent, or Firm*—P. J. Rasmussen; P. M. Emanuel; R. G. Coalter

[57] ABSTRACT

Video disc track numbers are conveyed during each video line by means of a tri-phase modulation of a data carrier recorded along with the picture and sound carriers on a video disc. Upon playback, the data sequence is processed to identify tracking errors occurring within each video field to thereby enable immediate correction of disc tracking errors on a line-by-line basis thus minimizing picture and sound interruptions caused by intra-field tracking errors.

4 Claims, 7 Drawing Figures

VIDEO DISC ENCODING AND DECODING SYSTEM PROVIDING INTRA-INFIELD TRACK ERROR CORRECTION

FIELD OF THE INVENTION

This invention relates to video disc systems and particularly to systems wherein field identification numbers are recorded in the vertical blanking interval and recovered upon playback of the disc to facilitate track error correction.

BACKGROUND OF THE INVENTION

Video disc players have inherent advantages in playing back video programs as compared with video tape players, e.g., the ability to quickly access the recorded information, relatively low replication costs, relatively simple mechanical requirements, etc. This, unfortunately, is accompanied by a basic disadvantage relating to tracking errors. Specifically, a forward or backward skip of one track on a helical scan VTR results in only a one field error in the location of the pick-up transducer. A single skip of one track convolution in a presently available video disc player (e.g., the RCA model SJT-100) results in an eight field error in the recovered signal. In another known player a skip of one track results in a two field error for disks recorded at a constant angular velocity.

It is known that one may correct tracking errors in a video disc player on a field-by-field basis thereby placing video disc players on a par with video tape players. An example, in U.S. Pat. No. 4,313,134 of Rustman et al., a video disc system is disclosed wherein field numbers are recorded in pulse code modulation (PCM) form during the vertical interval of each video field. This has become known as a digital auxiliary information code (hereinafter DAXI code). Tracking errors (e.g., locked or skipped grooves or information tracks) are detected in a player by noting an improper sequence of two or more decoded DAXI field numbers. Correction of the error is provided by means of a transducer deflector (e.g., a stylus "kicker" solenoid or piezoelectric element) which radially translates the pick-up transducer in a direction to reduce the tracking error until such time as the field numbers again form an orderly sequence. Other patents relating to the DAXI code, its generation, recovery and use in video disc player include U.S. Pat. Nos. 4,308,557 of C. B. Dieterich, 4,307,418 of Mindel et al. and 4,309,721 of Christopher.

Heretofore it has been recognized that a need exists for correction of tracking errors in video disc systems on a more frequent basis than the field-by-field (inter-field) basis provided in known video disc systems. Such a system is described by C. B. Dieterich in his U.S. patent application Ser. No. 556,444 filed Nov. 30, 1983, entitled "VIDEO DISC ENCODING AND DECODING SYSTEM PROVIDING INTRA-FIELD TRACK ERROR CORRECTION".

In the Dieterich system, a method for forming a video disc recording signal, for facilitating intra-field track error correction, comprises providing a video signal and a data sequence representative of field numbers. The video signal, the data sequence and a subset of the data sequence are processed to form a recording signal with the subset data sequence conveying partial tracking information on a line-by-line or plural line basis within each field. In a specific example of the Dieterich encoding system, the "partial" tracking data is conveyed by means of quadrature phase shift keying (QPST) of a subcarrier with local groove number (LGN) data and adding the QPSK signal to the mastering signal during a portion of the horizontal blanking interval for subsequent recovery in a video disc player. The player includes means for comparing an anticipated track number (from the recovered subsets) with the actual track number (from the corresponding portion of the full field number) to develop an error signal for radially translating the player pickup transducer in a sense to correct tracking errors when the numbers differ.

SUMMARY OF THE INVENTION

It is an advantage of the Dieterich system that the LGN data, being sent during a portion of the horizontal blanking interval, has little likelihood of interfering with the "active video" or displayed portion of the video signal when the disc is played back and viewed on a television receiver. However, the bandwidth requirements are relatively high due to the limited transmission time available.

It is an object of the present invention to provide improvements in systems of the general kind described to increase both the data transfer rate and the data detection reliability and, at the same time, reduce the system bandwidth requirements and simplify decoding and signal processing of the data in video disc players.

In accordance with the invention, a method for forming a video disc recording signal for facilitating intra-field track error correction upon subsequent playback of disc records recorded with said disc recording signal comprises the steps of providing a video signal with a binary data sequence representative of field numbers of said video signal and providing a subset of said data sequence representative of track identification numbers. The subset is tri-phase modulated on a first carrier wave and the video signal is frequency modulated on a second carrier wave, the two carrier waves being combined to form said recording signal.

A video disc player embodying the invention for use with discs recorded as described includes a signal recovery means for recovering the first data sequence from the recorded signal and a tri-phase demodulator means for demodulating the encoded data. A register means stores the demodulated data and a data processing means compares the subset of the video field numbers conveyed by the encoded data with corresponding bits of the first data sequence for developing an intra-field track error correction signal for application to the recovery means in a sense to reduce tracking errors occurring within a field of said video signal.

DETAILED DESCRIPTION

Figure 1:
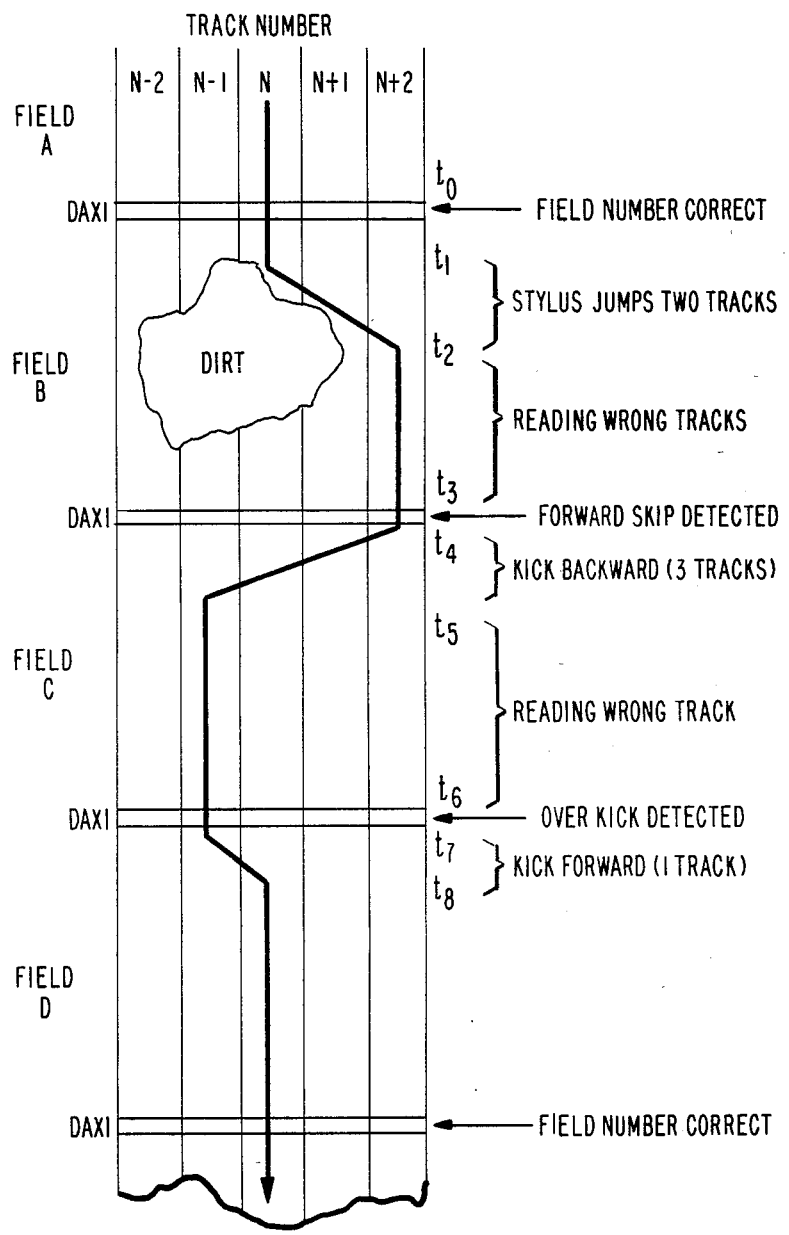
FIGS. 1 and 2 are plan views of a portion of a video disc record showing the locus of travel of a pick-up stylus in a disc player having field-by-field (inter-field) track error correction (FIG. 1) and line related track error correction in accordance with the invention (FIG. 2)
Figure 2:
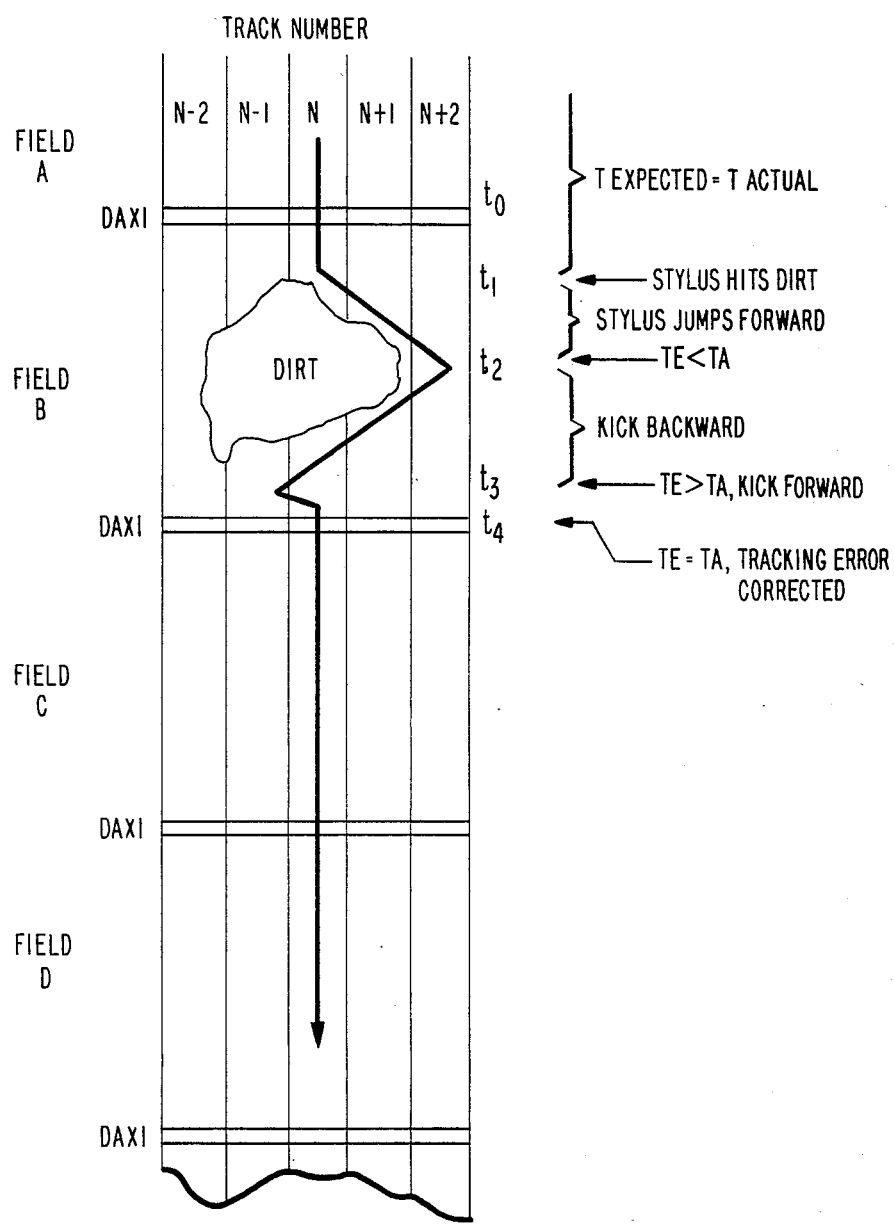

FIGS. 1 and 2 provide a comparison of a field-by-field track error correction method (FIG. 1) with the line-by-line correction method of the present invention (FIG. 2). In FIG. 1, five adjacent tracks of a disc record are shown along with the locus (path) of travel (dark arrow) of a signal recovery stylus. The term "track" as used herein, means an information conveying path on a disc and may be formed in a spiral or in concentric circles. The stylus is initially in track number N of field A at time t−0 and is lofted from the disc at time t−1 upon encountering a particle of dirt spanning tracks N−2, N−1 and N. At time t−2 the stylus lands in track number N+2 and continues in that track until the beginning of the next field (field C). Since the stylus has been radially translated by two tracks, the true tracking error amounts to a total skip of sixteen fields in a disc system where there are eight fields per disc convolution.

To correct the tracking error, the DAXI field number code recovered in the vertical interval of field B is compared with the code for field C which is recovered at time t−3. A kick pulse is applied to the stylus at time t−4 which, for illustrative purposes, results in an overkick in the interval t−4 to t−5 to track number N−1. The overkick is corrected in a similar fashion in field D until the stylus is again tracking the correct track N.

As seen, in this hypothetical example, the total time lost during track error correction amounts to about two fields. Even if the overkick had not occurred in field C, the disruption in the video signal would amount to about one field which would be visible in the displayed video image and audible in the reproduced sound. It is desirable to reduce the duration of the disruptions and thus increase the "fidelity" of the recovered image.

FIG. 2 illustrates the improvement which may be obtained when track error correction is provided on a line-by-line basis in accordance with the invention using information specially encoded with the video signal. As shown, the two corrections for traversing the dirt particle are accomplished well within the time frame of one field. For purposes of illustration, the size of the dirt particle is greatly exaggerated. In practice most disc defects are quite small relative to the physical dimension (length) of one field and so corrections may be made within a few lines. It should be noted from FIG. 1, however, that even a small defect in a disc with field-by-field track error correction can nevertheless result in a track error approaching one entire field or more in length.

Figure 3:
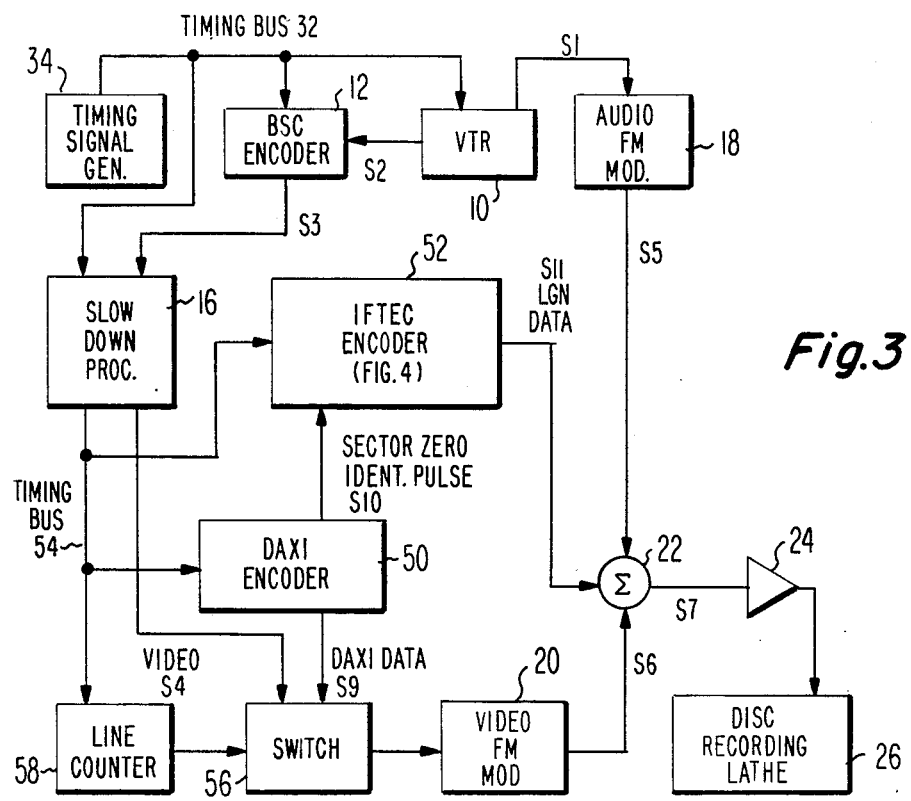
FIG. 3 is a block diagram of a video disc recording system embodying the invention.

The video disc mastering system of FIG. 3 includes a video tape recorder 10 for providing a source of audio signal S1 and video signal S2 to be recorded. Recorder 10 is preferably a slow motion recorder provided with automatic scan tracking (AST) to facilitate mastering at half rate (one half normal playback speed) using the skip field mastering technique described in detail in U.S. Pat. No. 4,277,796 of M. Ross entitled "SLOW DOWN COLOR PROCESSOR FOR VIDEO DISC MASTERING USING A SPECIAL MODE VTR". The video signal S2 is applied to a buried subcarrier (BSC) encoder 12 which, preferably, is of the type described in U.S. Pat. No. 3,872,498 of Pritchard. In the BSC format used in FIG. 3, chrominance information is represented by a color subcarrier of the general form employed in the well known NTSC format which is buried in a lower portion of the video band rather than being located in the high end of the luminance signal band. An illustrative subcarrier frequency choice is in the vicinity of 1.53 MHz with the color subcarrier sidebands extending plus or minus 500 KHz thereabout and with the luminance signal band extending well above the highest color subcarrier frequency (to 3 MHz, for example).

The BSC encoded video signal S3 is applied to a video slow down processor 16 which preferably is of the type described in the Ross patent. Briefly, in the Ross system selected fields of the redundant field (slow motion) video signal S3 are stored in a memory in processor 16 at a standard clock rate and recovered at a lower clock rate that is inversely proportional to the number of times each field is repeated so as to produce a non-redundant video output signal (S4 here) of reduced bandwidth. The bandwidth of the audio signal S1 is reduced by the same factor as the video signal (one half) during operation of recorder 10 in the slow motion mode. The audio signal S1 and the processed video signal S4 are applied to respective frequency modulators 18 and 20 and the resultant frequency modulated signals S5 and S6, respectively, are combined in a summing circuit 22 to form a resultant composite recording signal S7 processing the full informational content of the original audio and video signals. The recording signal S7 is applied via an amplifier/equalizer 24 to the cutterhead of a recording lathe 26. The turntable of lathe 26 is rotated by a drive motor (not shown) which receives half-rate drive signals produced by processor 16 whereby full bandwidth master recordings may be made with a cutterhead of less bandwidth.

Synchronization of recorder 10, encoder 12, and processor 16 is provided by means of a timing bus 32 supplied with timing signals (e.g., vertical, horizontal, color subcarrier, etc.) produced by a timing signal generator 34. A generator suitable for producing NTSC format standard video timing signals is the Tektronics Model 146 NTSC Test Signal Generator. (For mastering in other format such as PAL or SECAM an appropriate generator should be used).

The remaining elements of the mastering system encode digital data for recording along with the video signal on lathe 26. Two data encoders are provided, namely, a DAXI data encoder 50 and an intra-field track error correction encoder (IFTEC) 52. The encoders receive "half rate" timing signals from a bus 54 from slow down processor 16. The "half rate" timing signals include horizontal blanking pulses (HB/2), vertical field pulses (FV/2), horizontal sync pulses (HS/2) and the buried subcarrier reference frequency (FBSC/2). DAXI data encoder 50, illustratively, is of the type described in the aforementioned patent of Dieterich and the other patents relating to DAXI coding and provides video field and band numbers and other suitable information relating to the video signal produced by recorder 10 (e.g., bits may be assigned to identify monophonic or stereophonic or bilingual material, etc.). As an illustration, field identification numbers may be produced by encoder 50 by counting vertical field pulses provided via bus 54 from processor 16.

The DAXI data signal S9 is inserted in place of the video signal S4 on lines 17 and 280 of each frame by means of a multiplex switch 56 interposed between processor 16 and video FM generator (modulator) 20.

Switch 56 is controlled by a line counter/decoder 58 coupled to bus 54. Normally, switch 56 couples the video signal S4 to modulator 20 but changes over to couple the DAXI signal S9 when the line counter count is 17 or 180. The DAXI signal comprises a 77 bit PCM word synchronzied with the buried color subcarrier frequency (about 1.53 MHz at full rate, 1.53 MHz/2 for half rate mastering) to facilitate subsequent detection in a video disc player. Each DAXI word comprises a 13 bit start code (a Barker sequence for data framing) followed by a 13 bit CRC (cyclic redundancy check) error check code and ending with a 51 bit information code. Of the 51 bits in the information code, 6 provide a record band number, 18 provide a video field identification number (each field on a disc side is uniquely identified) and the remaining 27 are currently unassigned but are included to provide information capacity for future expansion or other uses of the DAXI code.

The IFTEC encoder 52 receives timing signals (at half rate for half rate mastering) from bus 54 and a disc sector zero identification pulse S10 from DAXI encoder 50. The sector zero pulse synchronizes the encoder, as will be explained, which provides local groove number output data in the form of a tri-phase modulated carrier wave at $\frac{1}{3}$ of the BSC frequency (about 495 KHz, real time, half that for half rate recording). The modulation is in the form of a modulo 27 number (actually, 3 modulo 3 trinary digits) which is incremented at the turntable once-around rate and transmitted during three of five signaling intervals of each video line. The two other intervals are used for conveying a reference phase signal and a parity check signal. The use of tri-phase modulation provides improved signal recovery during disc play (as compared with QPSK) and simplified decoder circuitry. Modulo 27 is used with tri-phase modulation for maximum data transfer efficiency. The LGN carrier wave S11 is then added to the sound S5 and video S6 signals in summer circuit 22 for recording on lathe 26.

Figure 4:
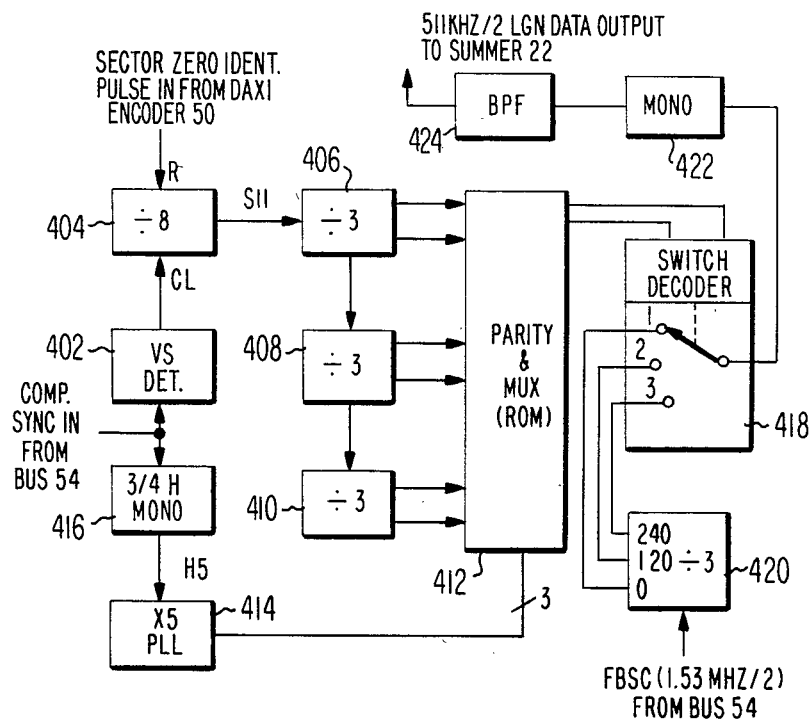
FIG. 4 is a detailed block diagram of an intra-field track error correction (IFTEC) encoder suitable for use in the system of FIG. 3.
Figure 5:
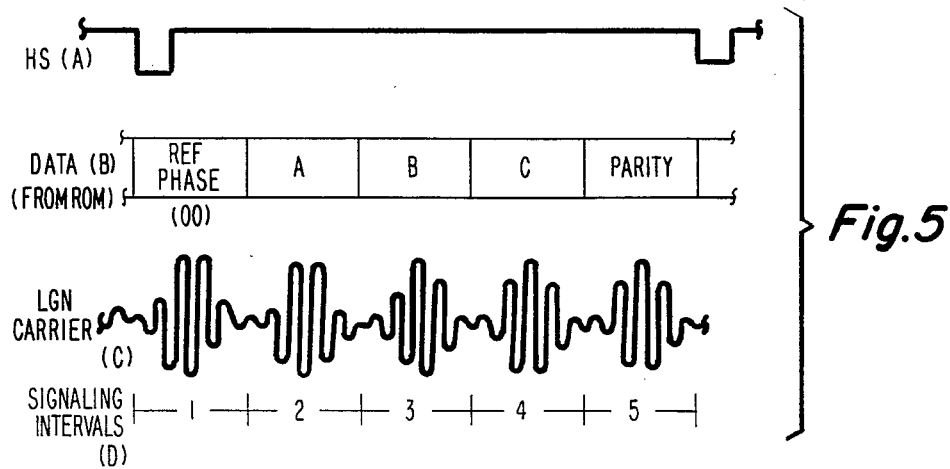
FIG. 5 is a waveform diagram illustrating operation of the system of FIG. 3.

Encoder 52 and details of the LGN format are shown in FIGS. 4 and 5, respectively. The encoder comprises a vertical sync detector 402 which clocks a divide-by-eight counter 404 which is reset by the sector zero identification pulse thereby providing output pulses at the turntable once-around rate S11 and related to a specific sector (zero) of the disc being recorded. Sector zero is where the DAXI fourth bit (as counted from the LSB) of the DAXI field number code changes and is the least significant bit of the DAXI "groove" or "track" number.

The "groove rate" signal S11 is counted in modulo 27 by means of a cascade connection of the three divide-by-three counters 406, 408 and 410. These counters are conventional binary counters and provide output signals, in binary, having the three possible states of 00, 01 and 10. The count ranges from zero to twenty six, thus providing 27 possible LGN numbers. The conversion to ternary (three state) logic, multiplexing the ternary bits and generation of parity is provided in a ROM (read only memory) 412 which is addressed by the outputs of counters 406–410. The ROM 412 is, in essence, a "look-up table" which produce binary words representative of the 27 possible states of counters 406–410 and parity. Data is read from ROM 27 five times per line by means of a times five multiplying PLL 414 which receives HS from bus 54 via a $\frac{3}{4}$ H monostable multivibrator 416 (this removes the composite sync equalizing pulses). The PLL counter 414 (which provides the time five multi- plication of HS) addresses three of the ROM address inputs for selecting what data (e.g., parity, phase reference or LGN data) is selected during the five signaling intervals (1–5) of FIG. 5.

During the first signaling interval (1) the ROM outputs digits 0-0 to a multiplex switch 418 that selects a phase zero reference signal. The three phases (0, 120 and 240 degrees) are provided by a divide-by-three ring counter 420 which divides the buried subcarrier frequency (FBSC) by three and supplies the three phases to switch 418. The selected zero degree reference phase is supplied to a monostable multivibrator 422 having a period selected to insure symmetry of the waveform and the signal is then smoothed in a band pass filter 424 and supplied to summing circuit 22 for addition to the video recording signal. FIG. 5c illustrates the band pass filter (fc equal to $\frac{1}{3}$ FBSC) signal. During signaling intervals 2, 3 and 4 (FIG. 5d) the three ternary bits (modulo 27) A, B and C are encoded, each having one of three possible phases depending on its value. A zero, for example, may be encoded as phase zero, a one as phase 120 and a two as phase 240. The final signaling interval contains a ternary parity bit. Parity in the LGN data is not necessary to the present invention but may be used as a relatively simple check on received data validity. A more "powerful" validity check is described in connection with the program flow chart of FIG. 7.

Figure 6:
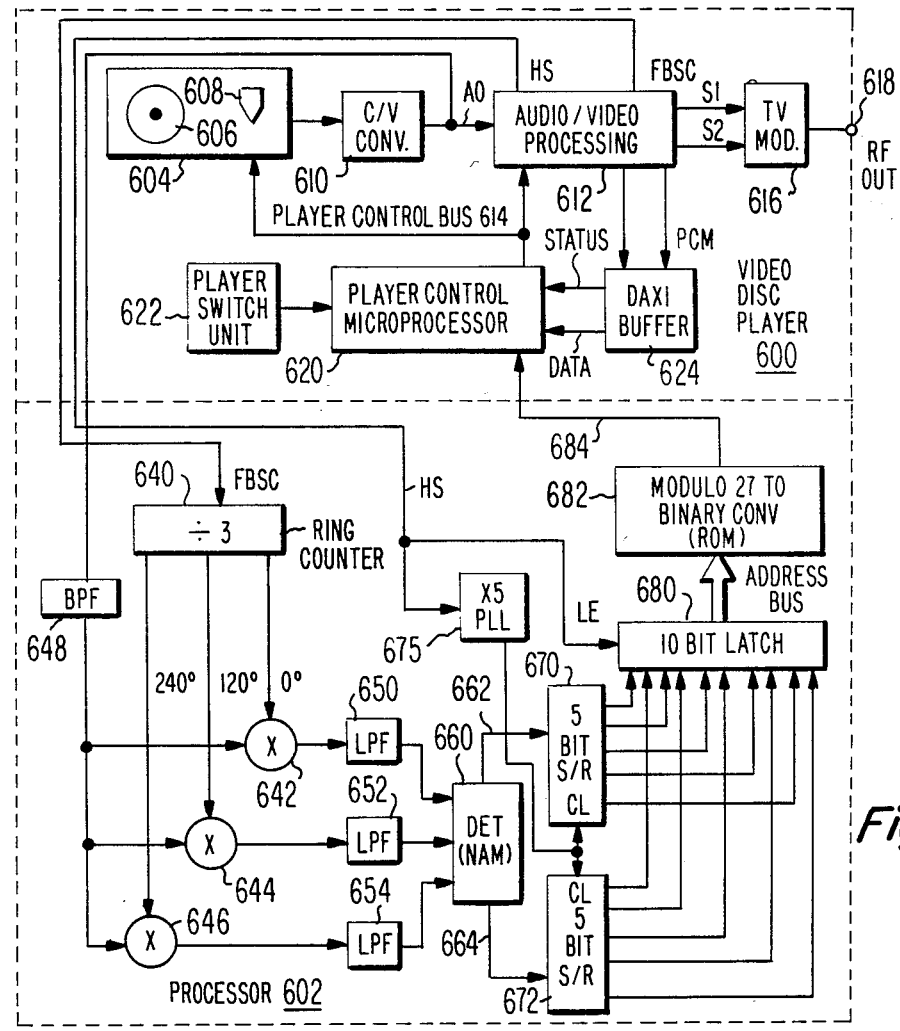
FIG. 6 is a block diagram of a videodisc player embodying the invention.

FIG. 6 is exemplary of a video disc player 600 (outlined in phantom) modified by the addition of an intra-field track error correction (IFTEC) processor 602 (also outlined in phantom) to provide the line-by-line track error correction feature of the invention when playing back video disc records mastered as previously described. The player 600 may be of conventional design such as the model SJT-400 CED video disc player manufactured by RCA Corporation. The principles of the invention, of course, may readily be applied to any form of video disc player wherein field or tracking information is conveyed during the vertical interval of a field by a coding system such as the DAXI system or some other suitable system. Of importance to an aspect of the present invention is that there be some form of "primary" coding system for conveying tracking information on a field-by-field basis or at least a frame-by-frame basis and a "secondary" coding system for conveying local groove numbers related to the primary tracking information on a line basis. In the present system, the intra-field tracking information is conveyed on a one-line basis, that is, the tracking information is available every line throughout each field.

Player 600 includes a turntable mechanism 604 for rotating a video disc record 606 and a pickup transducer 608 for recovering information signal from the disc. In the CED system, the information is stored in the form of topological variations of a spiral information track and recovered by sensing capacitance variations between a stylus in transducer 608 and the record 606. The output of transducer 608 is applied to a capacitance-to-voltage (C/V) converter 610 which produces an FM output signal representative of the recorded information. Such records and suitable circuits for implementing the C/V conversion are well known. See for example, U.S. Pat. Nos. 3,783,196 (Stanley), 3,842,194 (Clemens) and 4,080,625 (Kawamoto et al.).

The FM signal is applied to an audio/video processor 612 which produces a baseband audio output signal S1 and a baseband composite video output signal S2. Processor 612 has an input connected to a player control bus 614 for receiving squelch signals for muting the audio and video signals under certain player operating conditions (.e.g., "pause"). Bus 614 also conveys turntable motor and tracking control signals to mechanism 604. Pyles et al., in U.S. Pat. No. 4,286,290 entitled "FAST RECOVERY SQUELCH CIRCUIT FOR A VIDEO DISC PLAYER" which issued Aug. 25, 1981, discloses a suitable implementation of processor 612 which provides timebase error correction circuitry and format conversion circuitry for converting the recovered video signal from the buried subcarrier format proposed by Pritchard in U.S. Pat. No. 3,872,498 to the NTSC format. Carnt et al., in U.S. Pat. No. 4,200,881 describe processors suitable for recording and reproducing composite video signals of PAL format.

The baseband audio and video signals S1 and S2 produced by processor 612 are applied to the sound and picture carrier modulation inputs of a TV modulator 616 which has an RF output terminal 618 for connection to the antenna input terminal of a conventional television receiver for displaying sound and picture information recovered from disc 606. An integrated circuit suitable for use as modulator 616 is the type LM 1889 available, for example, from National Semiconductor, Inc.

A player control microprocessor 620 provides various supervisory and information display control functions. The control functions (supplied via bus 614) include, illustratively, "stylus kicking" and control of the radial position, elevation, velocity and direction of movement of pick-up transducer 608 relative to disc 606 and squelching of the audio and video signals produced by processor 612. Some of the functions are initiated manually by means of a player control switch unit 622 coupled to an input port of microprocessor 620. Manually initiated functions include, illustratively, play, pause slow scan forward or reverse, etc. Upon closure of one of the user activated switches in unit 622, microprocessor 620 addresses its internal read only memory (ROM) and fetches an appropriate sequence of instructions resident in the memory for effecting the desired control function.

DAXI information (e.g., field numbers, band numbers, etc.) is conveyed to microprocessor 620 by means of a DAXI BUFFER integrated circuit 624 having inputs coupled to receive PCM data and a 1.53 MHz clock signals (FBSC) from processor 612 and having outputs coupled to supply data and a data status flag signal to input ports of microprocessor 620. When a DAXI code word is received without error, the status flag is SET and microprocessor 620 processes the data for machine control purposes (e.g., detecting stop flags or end of record bits) and player display purposes (e.g., calculation of elapsed playing time from the 18 bit field number data). Buffer 624 and microprocessor 620 are commercially available integrated circuits and are described in more detail in the previously mentioned DAXI related U.S. patents.

Buffer 624 is interfaced with a comb filter (not shown) in processor 612 for detecting the PCM DAXI data as described in C.B. Dieterich's U.S. Pat. No. 4,275,416 entitled "PCM DETECTOR" which issued June 23, 1981. For the purposes of the present invention, only three types of signals are needed from video disc player 600 for use in the IFTEC processor 602. They are: the player "arm output" (AO) signal provided by capacitance-to-voltage converter 610; a 1.53 MHz buried subcarrier reference frequency (FBSC) signal provided by a phase lock loop (PLL) (not shown) within processor 612; and a horizontal sync (HS) output signal provided by a sync detector (not shown) in processor 612.

The subcarrier reference frequency signal FBSC (about 1.53 MHz in NTSC players) is applied to a divider 640 (e.g., a ring counter) in processor 602 which provides ⅓ FBSC frequency output signals having phases of 0, 120 and 240 degrees. These signals are applied to respective ones of three multipliers 642, 644 and 644 which each receive the AO signal (after filtering in a band pass filter 648 centered at a frequency of ⅓ FBSC). Detection of which phase is being transmitted is provided by low pass filtering (40 KHz) the outputs of multipliers 642-646 with filters 650-654, respectively and applying the filter outputs to a three-input non-additive mixer 660. A suitable non-additive mixer includes three common emitter connected PNP transistors sharing a common emitter load resistor and each having a separate collector resistor whereby only the transistor having the lowest base voltage will be turned on. The transistor collector load resistor coupled via diodes to two output lines 662 and 664 poled to provide outputs of 00, 01, and 10 in response to the presence of phases 0, 120 and 240 degrees as detected by multipliers 642-646, respectively. Lines 662 and 664 are coupled to respective data inputs of a pair of 5 bit shift registers 670 and 672 which receive a common clock signal of 5 times the line rate. The clock signal is provided by a times five multiplying PLL 675 which is locked by the HS signal from processor 612. Thus, during each line registers 670 and 672 are loaded with ten bits of data (see FIG. 5). The first two convey the phase reference (0, 120 or 240 degrees), the next three pairs of bits convey ternary data A, B and C (the LGN) and the last two convey parity. At the end of each line the HS signal (applied to the latch enable LE input of a 10 bit latch 680) causes a transfer of the data from registers 670 and 672 to latch 680. This provides temporary data storage during the next line while registers 670 and 672 are being re-loaded with new LGN data. At this pont latch 680 contains reference phase data, LGN data in module 27, and parity data. All ten bits are applied to the address inputs of a modulo-27-to-binary converter 682 which, as in the encoder, comprises a ROM look-up table for converting the LGN data to natural binary. The ROM has, in fact, three "look-up" tables, one for each reference phase (0, 120, 240 degrees) accompanying the LGN data. In this way, detection and conversion of the LGN data is "self contained" in processor 602, so to speak, in that no field or line identification is required from the player processing circuits. The output of ROM 682 comprises 5 bits to represent the 27 possible local groove numbers plus a parity bit which are applied via bus 684 to the player control microprocessor 620 which processes the LGN data to effect intra-field track error correction.

As an example, assume that the local groove number changes during a field. This would indicate a skip of transducer 608 and processor 620 would send kick pulses via bus 614 to the stylus kicker (not shown) in transducer 608 in a sense to return the LGN number to its correct value. The same correction can be made if the local groove number changes at any sector other than sector zero. Recall that the LGN encoder counter is synchronzied with sector zero and that this data is conveyed by the last three bits of the 18 bit DAXI code. Therefore the DAXI sector check provides a convenient means of checking the validity of the local groove number and vice versa.

Figure 7:
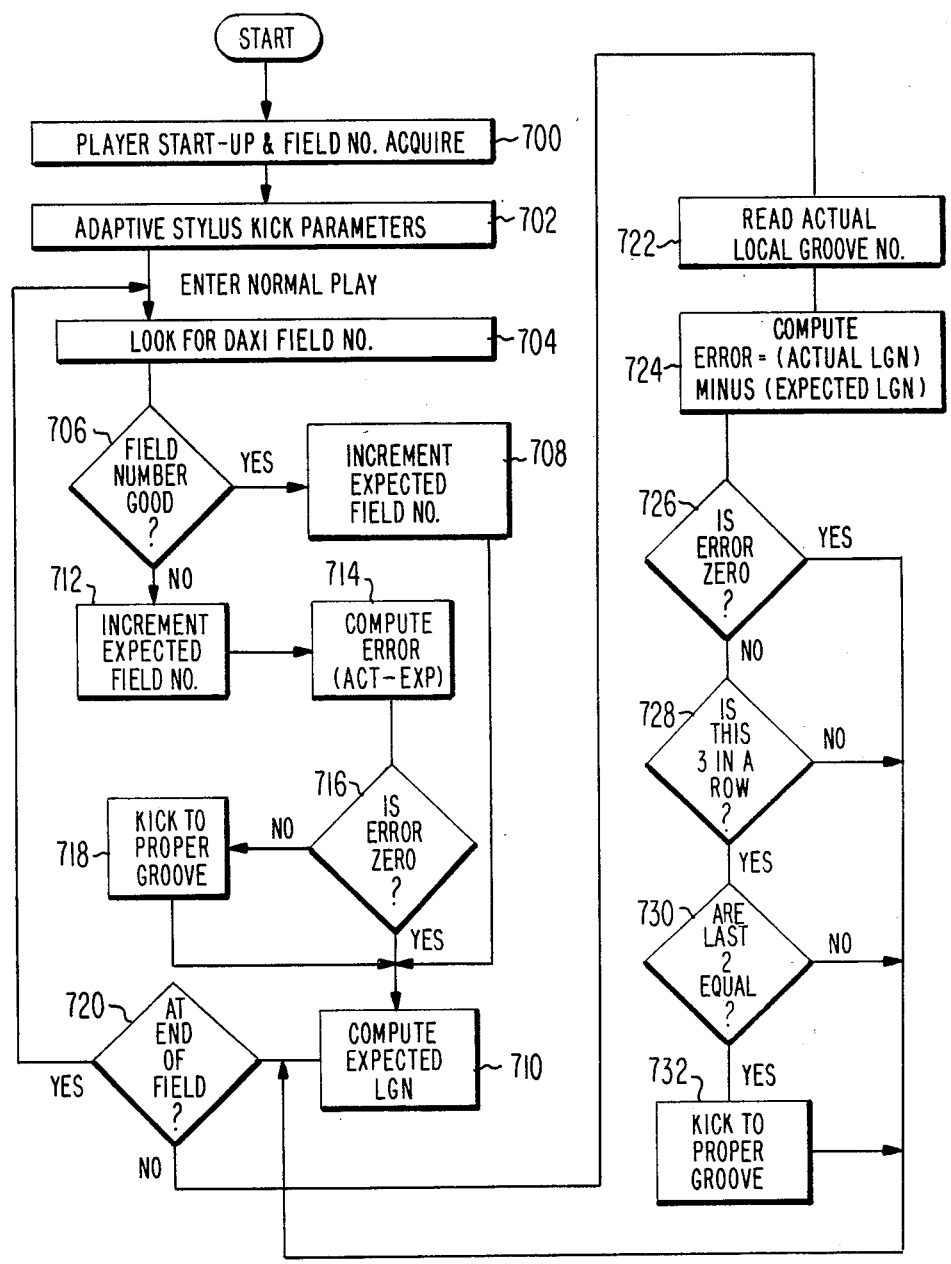
FIG. 7 is a program flow chart suitable for use in the player of FIG. 6.

In order to improve the validity or "integrity" of the local "groove" or track numbers recovered from the player, microprocessor 620 may be reprogrammed as indicated in the flow chart of FIG. 7. The program begins with a conventional start-up routine (boxes 700,702) described in the previously mentioned DAXI patents which include a detailed machine state diagram. When the player enters the "enter normal play" state the first subroutine step is to "look for DAXI field number" (704) which, in the player of FIG. 6 comprises simply monitoring the DAXI status flag produced by buffer 624. In the well known DAXI system, all fields are numbered in sequence. The next stage of the program is to verify the sequence since it is possible to receive a valid DAXI code but, due to a skip for example, the field number may be out of sequence. Accordingly, the first test is to determine if the field number is "good" (in sequence) (box 706). If so, the current field number is incremented (708) and the program continues to compute the "expected local groove number" (710). This involves storing the 5 bits of LGN and incrementing it at sector zero. The sequence should progress from 0 to 27 and repeat. (Alternatively, the LGN may be computed by dividing the DAXI field number by 27 and using the remainder).

If the field number test (706) is "bad", then the "expected" number is incremented (712) the difference between the actual DAXI number and the expected number is computed (by subtraction, 714) to determine the magnitude and direction of the error. If, in fact no error is present (difference zero, 716) the program continues to compute the expected LGN (710), else the program causes the microprocessor to send kick pulses to transducer 608 to radially translate to the correct groove (718) and then continues on to 710 to compute the expected LGN number as mentioned. Then a test is performed to determine if the end of field has been reached (720, counting field lines). If so, then the program branches back to the "enter normal play" point and steps 704–720 are repeated. If it is not the end of a field, then the program enters a branch which operates on the LGN data from unit 602 to provide intra-field track error correction tests and to provide correction action, if needed.

The read LGN step 722 is provided by registers accessing the output of ROM 682 in unit 602 and the computation (comparing) step (724) is provided by subtraction in processor 620. If the subtraction of the computed groove number from the actual recovered groove number of unit 602 is zero (726) then the program assumes that no tracking error has occurred and branches back to the end of field test (720). If not zero, a test is performed (728) to determine if errors have occurred three times in a row. If not, there is a branch back to the end of field test 720. If so, a test is performed (730) to determine if the last two readings were equal. If not there is a branch back to the end of field test. If so, the program enters a kick routine 732 to radially translate the signal recovery transducer 608 to the groove number indicated by unit 710.

What is claimed is:

1. A method for forming a video disc recording signal for facilitating intra-field track error correction upon subsequent playback of disc records recorded with said disc recording signal comprising the steps of:
   (a) providing a video signal inclusive of a binary data sequence representative of field numbers of said video signal;
   (b) providing a subset of said data sequence representative of track identification numbers;
   (c) encoding said subset by tri-phase modulation of a first carrier wave;
   (d) frequency modulating a second carrier wave with said video signal; and
   (e) combining said first and second carrier waves to form said disc recording signal.

2. The method recited in claim 1 wherein said tri-phase modulated carrier wave comprises a plurality signaling intervals per line of said video signal, the first conveying a reference phase signal, and at least a second, third and fourth conveying said encoded data representative of said subset of said data sequence.

3. A video disc player for use with video disc records recorded with a signal manifestation including a video signal having a first data sequence representative of field numbers of said video signal and including a tri-phase moudulated carrier wave having a plurality of signaling intervals per line of said video signal, the first conveying a reference phase component, additional ones of said signaling intervals conveying encoded data representative of a subset of said first data sequence corresponding to a tracking identification number, comprising:
   (a) recovery means for recovering said first data sequence from said recorded signal manifestation;
   (b) tri-phase demodulator means responsive to said reference phase component for demodulating said encoded data;
   (c) register means coupled to said demodulator means for storing said demodulated encoded data;
   (d) data processing means coupled to said recovery means for receiving said first data sequence and to said register means for receiving said demodulated data for comparing said subset of said video field numbers conveyed by said demodulated encoded data with corresponding bits of said first data sequence for developing an intra-field track error correction signal; and
   (e) means for applying said intra-field track error correction signal to said recovery means in a sense to reduce tracking errors occurring within a field of said video signal.

4. A video disc player as recited in claim 3 wherein said data processing means comprises microprocessor means programmed to provide at least one test of said subset of said field number as represented by said demodulated encoded data stored in said register means prior to producing said tracking error correction signal so as to prevent erroneous radial translation of said recovery means in the event of invalidity of said subset of said field numbers.

* * * * *

UNITED STATES PATENT AND TRADEMARK OFFICE
CERTIFICATE OF CORRECTION

PATENT NO. : 4,562,487

DATED : December 31, 1985

INVENTOR(S) : Robert Norman Hurst, Jr. and Michael Allen Plotnick

It is certified that error appears in the above-identified patent and that said Letters Patent is hereby corrected as shown below:

The title should read --VIDEO DISC ENCODING AND DECODING SYSTEM PROVIDING INTRA-FIELD TRACK ERROR CORRECTION--.

Column 10, line 27, delete "moudulated" and insert --modulated--.

Signed and Sealed this

Twentieth Day of May 1986

[SEAL]

Attest:

Attesting Officer

DONALD J. QUIGG

Commissioner of Patents and Trademarks